Dec. 15, 1936.  R. F. KOHR  2,064,613
BRAKE
Filed Dec. 29, 1932  4 Sheets-Sheet 1

INVENTOR.
ROBERT F. KOHR
BY
ATTORNEY

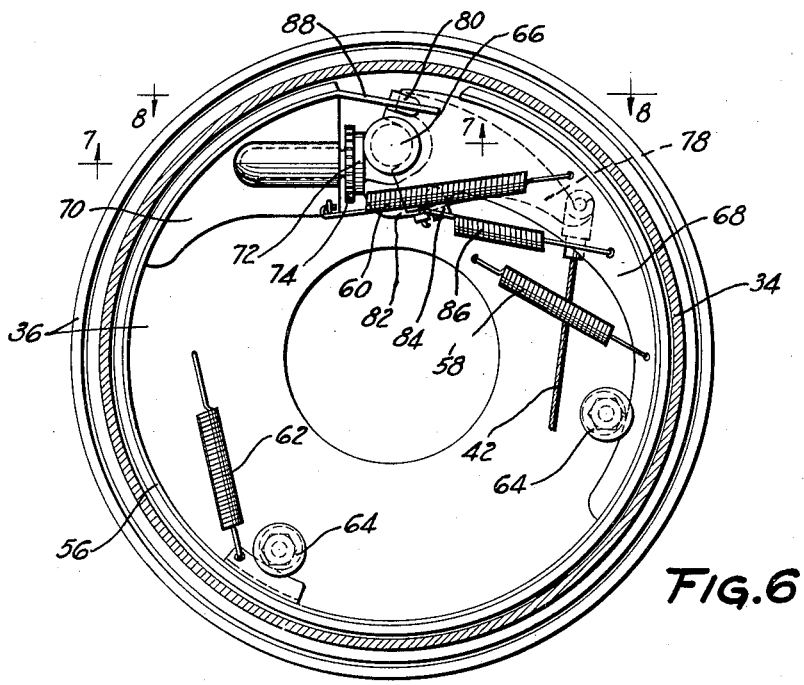
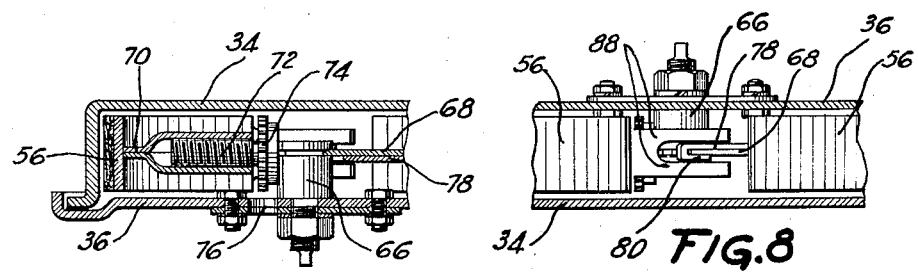
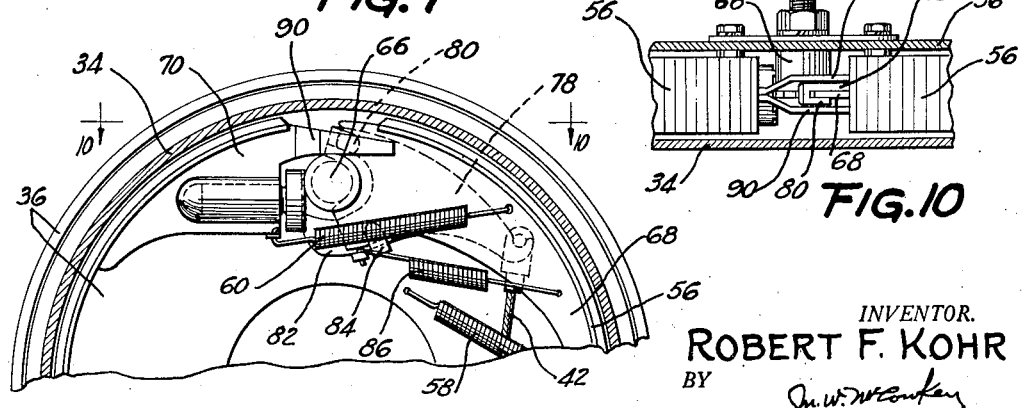

Dec. 15, 1936.  R. F. KOHR  2,064,613
BRAKE
Filed Dec. 29, 1932  4 Sheets-Sheet 3

INVENTOR.
ROBERT F. KOHR
BY
ATTORNEY

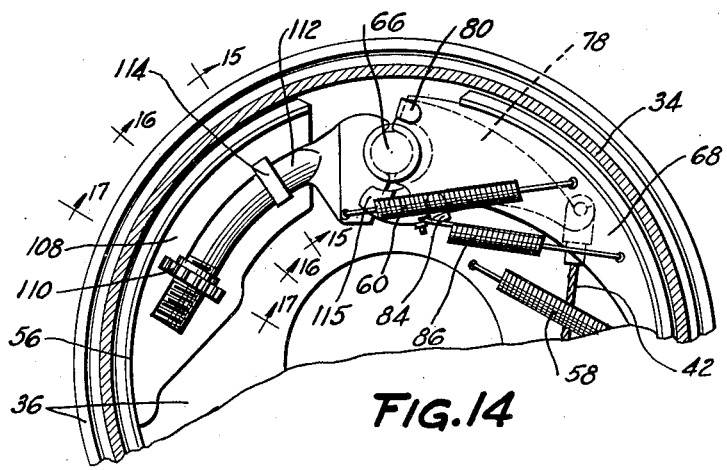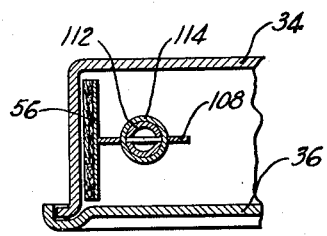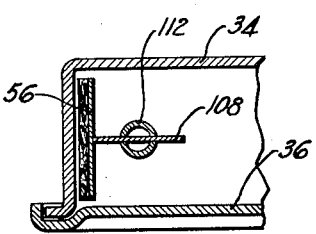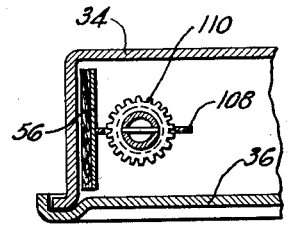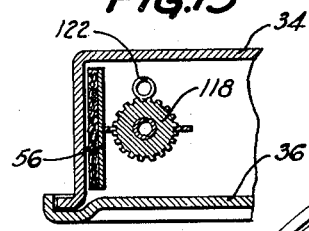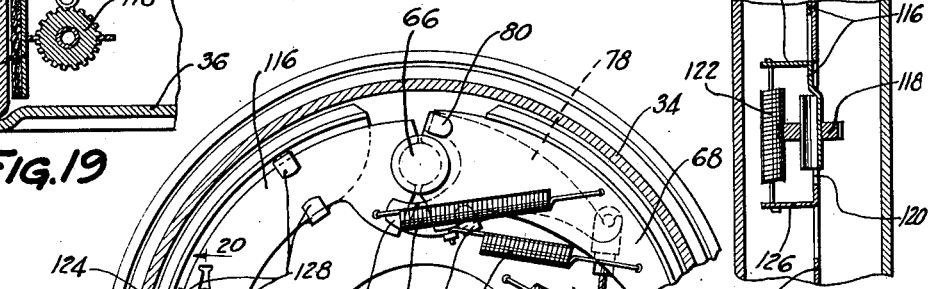

Patented Dec. 15, 1936

2,064,613

UNITED STATES PATENT OFFICE 2,064,613

BRAKE

Robert F. Kohr, South Bend, Ind., assignor to Bendix Aviation Corporation, South Bend, Ind., a corporation of Delaware Application December 29, 1932, Serial No. 649,373

12 Claims. (Cl. 188—78)

This invention relates to brakes, and is illustrated as embodied in brakes of the internal expanding type for a four-wheel automotive brake system.

An important feature of the invention relates to the operation of the brake by a novel floating lever, preferably having a thrust portion projecting past the brake anchor and being formed with one or a pair of integral tongues bent back parallel to the lever body and arranged to embrace the web of the brake band or shoe, and shown in the particular brake illustrated as cut away to clear the brake anchor and as being arranged in the space between the web of the shoe or band and the backing plate.

Preferably the above-described thrust portion of the novel applying lever, or its equivalent, engages an adjustable thrust part which in itself and in its mounting embodies substantial novelty and which is carried by the opposite end of the brake friction means and which is adjustable to compensate for wear of the friction means.

I prefer to make this adjustable part of a steel stamping, or a pair of such stampings, having a head formed to engage the brake anchor (and the applying lever), and a body or shank arranged beside the reinforcing web of the friction band and formed in a cylindrical shape which may desirably be threaded to receive an adjusting nut seated in a slot in the web.

Where two stampings are used, I weld or otherwise secure together the anchor-engaging heads, and space the cylindrical shanks apart far enough to straddle the reinforcing web and overlie the slot in which the adjusting nut is arranged.

The above and other objects and features of the invention, including a novel structure at the end of the friction means which is adapted to overlie the brake anchor, and a simplified hookup for operating the brakes, and other novel combinations of parts and desirable particular constructions, will be apparent from the following description of the illustrative embodiments shown in the accompanying drawings, in which:

Figure 6 is a vertical section through one of the front brakes, just inside the head of the brake drum and showing the brake friction means in side elevation, and being on the line 6—6 of Figure 3 except that for convenience of illustration it is rotated clockwise ninety degrees to bring the brake anchor at the top instead of at the front of the brake;

Figure 7 is a partial section on the line 7—7 of Figure 6, showing the brake adjustment;

Figure 8 is a partial section on the line 8—8 of Figure 6, showing how one end of the friction means is provided with novel arms overlying the brake anchor and straddling the brake-applying means;

Figure 9 is a partial section showing a modification, and corresponding to the upper part of Figure 6;

Figure 10 is a partial section on the line 10—10 of Figure 9;

Figure 1:
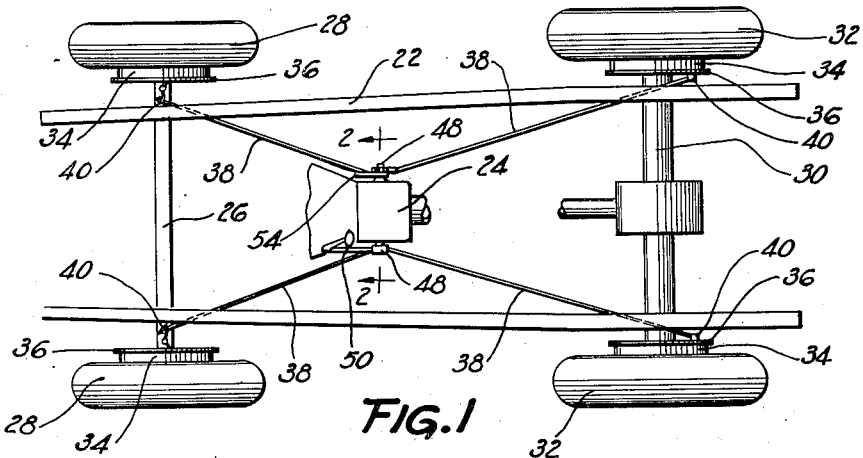
Figure 1 is a top plan view of an automobile chassis having a brake system embodying the invention.
Figure 2:
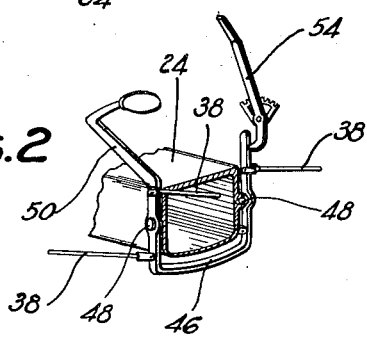
Figure 2 is a perspective broken away on the line 2—2 of Figure 1, and showing the mounting of part of the brake hookup on the transmission.

Figures 11, 12, 13, and 14 are partial sections through different modifications, corresponding to Figure 9;

Figure 15 is a partial section on the line 15—15 of Figure 14, and showing the mounting of the adjustable thrust member;

Figure 16 is a partial section on the line 16—16 of Figure 14;

Figure 17 is a partial section on the line 17—17 of Figure 14;

Figure 18 is another section corresponding to Figure 9, and showing another modification;

Figure 19 is a partial section on the line 19 of Figure 18; and

Figure 20 is a partial section on the line 20—20 of Figure 18.

The illustrated chassis includes a frame 22 supporting an engine (not shown) and a transmission 24, and carried on the usual vehicle springs (not shown) mounted on a front axle 26 to which are swiveled front wheels 28, and on a rear axle 30 having road wheels 32. Each of the wheels is provided with a novel brake, more fully described below, housed in a brake chamber formed by a rotating drum 34 and a stationary support such as a backing plate 36, mounted on the front wheel knuckle or on the rear axle as the case may be.

The four brakes may be operated by four cables 38 connected to levers 40 at the brakes (Figure 1), or cables 42 passing at their ends through conduits 44 (Figure 3) into the brakes and there connected to floating levers described below. The cables 38 or 42 are connected to the opposite arms of a U-shaped double lever 46, on opposite sides of pivots 48 mounting the latter on the transmission 24.

Figure 4:
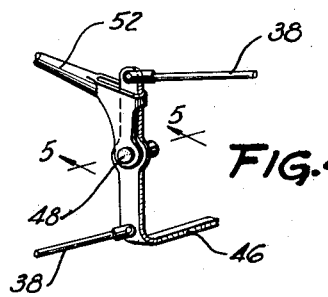
Figure 4 is a perspective of part of the hookup, looking in the direction of the arrow "4" in Figure 3.
Figure 3:
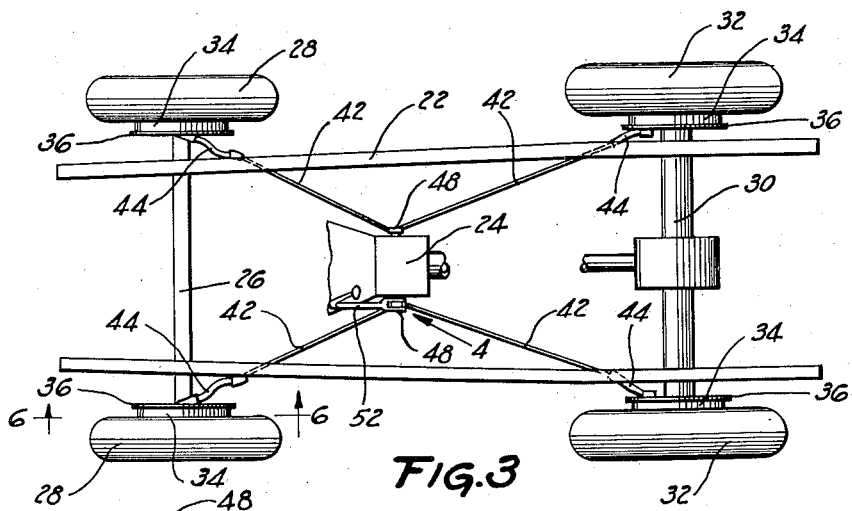
Figure 3 is a top plan view of a chassis, with so-called "cable and conduit" operating connections to the brakes.
Figure 5:
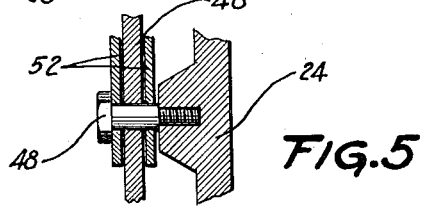
Figure 5 is a section on the line 5—5 of Figure 4.

The left arm of the double lever 46 is shown in Figures 1 and 3 as integral with a service brake pedal 50, and in Figures 3–5 as having lost-motion or one way connection with a pedal 52 mounted on the left pivot 48, while in either case the right arm is alternatively and independently operable by engagement with a hand emergency or parking brake lever 54 which may be provided with the usual ratchet (not shown).

The brake proper, in the form illustrated in Figures 6–8, includes friction means shown as a resilient steel band or ring 56, faced with the usual brake lining, and provided with suitable return springs 58, 60, and 62 urging the band to a released position determined by suitable adjustable eccentric stops or the like 64. Between the ends of the band 56 or its equivalent is arranged a stationary brake anchor or post 66, mounted on the backing plate, one or both of the ends of the brake band being formed with notches or sockets seated against the anchor.

To this end the ends of the band are suitably reinforced by stamped steel webs, in which these sockets may be formed. In the brake of Figures 6–8, the right end of the band has secured thereto, for example by a series of spot-welds, a single stamped steel web 68 of tapering form, notched at its end to provide the described socket seated against the anchor 66.

The opposite end of the band, in this embodiment, has welded thereto and to each other two stampings 70, formed as appears in Figure 7 with registering grooves forming a socket extending inwardly along the reinforcement and which may be internally threaded adjustably to receive the threaded stem of a thrust member 72 having a head engaging the anchor 66, and preferably having a serrated or toothed collar 74 accessible through an opening 76 in the backing plate, for engagement with a suitable tool to turn the thrust member 72 to adjust the brake.

According to an important feature of the invention, the end of the cable 42, or its equivalent, is connected inside the brake to a novel floating lever 78 arranged between the backing plate and the web 68. The lever 78 preferably has a tongue 80 bent back parallel to the lever body, and hooked over and embracing the end of the web 68 together with, on the opposite side of the anchor 66, a thrust portion 82 extending past the anchor 66 and engaging the head of the adjustable member 72 (so that a single adjustment serves for both the anchorage and the applying means).

It may also preferably have on its side another integral tongue 84 bent back parallel the lever body and arranged to embrace the lower side of the web 68, and serving not only to hold the lever against twisting but also as a stop determining the released position to which the lever is urged by means such as a spring 86 tensioned between the web 68 and a lug on the lever.

In the arrangement of Figures 6 and 8, the rim of the above-described band is extended in the form of two parallel arms 88 overlying and engaging the anchor 66, and having the lever 78 arranged between them. In the arrangement of Figures 9 and 10, corresponding arms 90 are formed on the stampings 70.

Figure 11:
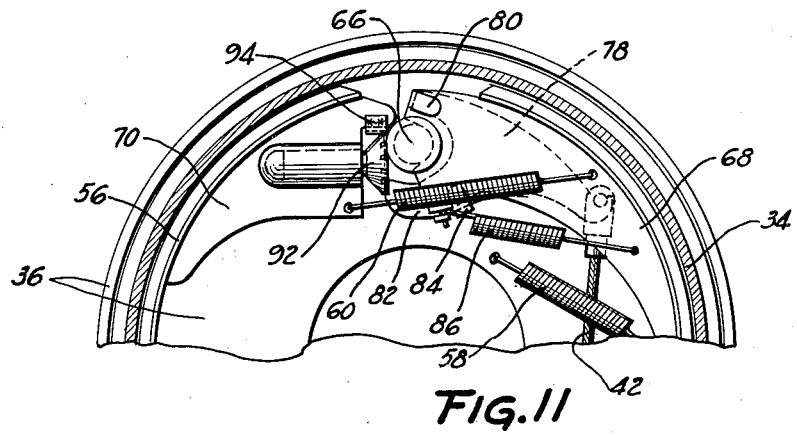

The brake of Figure 11 differs slightly from that described above, in that the teeth for turning the adjusting member 92, corresponding to member 72, are formed directly in the head of that member and preferably are yieldingly engaged by a spring locking pawl 94 secured to the ends of the stampings 70.

Figure 12:
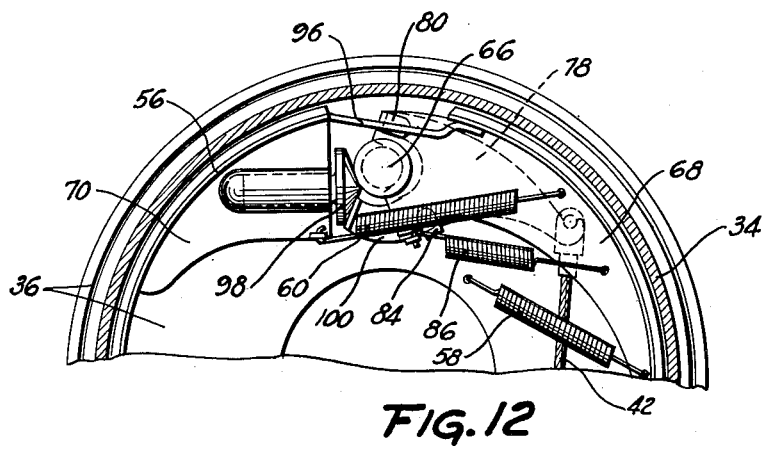

In Figure 12, the projecting arms 96, corresponding to the arms 88, overlie the anchor but engage the lower face of the rim at the opposite side of the band; also the adjusting member 98 (corresponding to member 72) has a conical head, and the shape of the thrust portion 100 of lever 78 is correspondingly modified.

Figure 13:
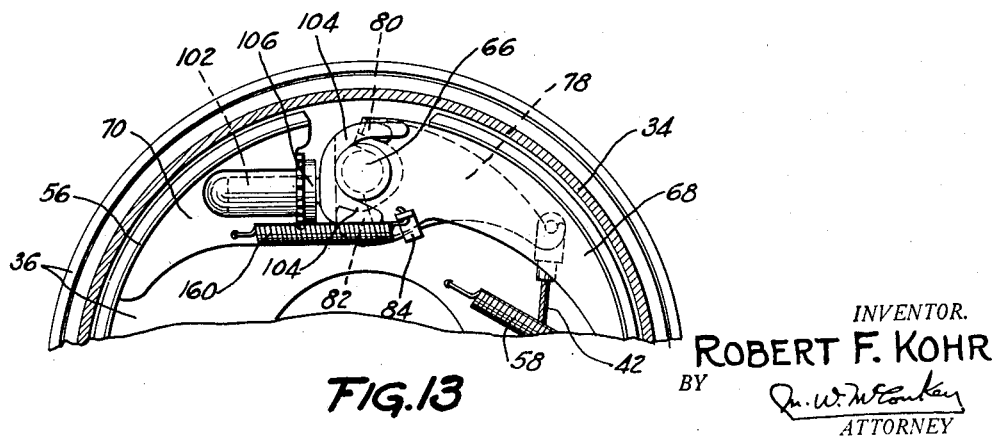

In Figure 13 the adjusting member 102 is formed with arms 104 notched to form sockets embracing the anchor 66, the upper arms 104 preferably engaging the opposite end of the rim on its inner face. In this arrangement the return spring 160 is shown tensioned between the web 70 and the bent-over tongue 84. If desired, in order to avoid having to turn the adjusting member 102 (which would be difficult on account of arms 104), it may be threaded to receive an adjustable thrust nut 106, in which case the socket in web 70 need not be threaded but may merely receive member 102 with a loose sliding fit.

In the modification of Figure 14, instead of the double web 70 there is a single web 108 welded to the inner face of the band 56 at its end, and slotted or otherwise formed with an opening to receive an adjustment nut 110 threaded on a two-part externally-threaded cylindrical stem of a thrust member 112 guided by a clip 114 secured to the web 108. Member 112 is shown formed by welding together the head portions of two steel stampings having semi-cylindrical stems or extensions straddling the web 108 and overlying the slot in which the nut 110 is received, and with the double-thickness head notched to form a recess embracing the anchor 66. Turning the nut 110 shifts the member 112 lengthwise along the web 108, to adjust the brake for wear. Lever 78 in this case has a thrust portion 115 which is L-shaped in section, and which is in thrust engagement with the end of the member 112.

In the arrangement of Figures 18–20, the adjustable thrust member is in the form of a single stamping 116 overlying the web 108, and having the portion overlying the slot in which the adjustment nut 118 is seated folded or rolled to provide an externally-threaded cylindrical portion on which nut 118 is mounted, and which is shown (Figure 20) arranged in a slot 120 extending lengthwise of the web 108 and intersecting the slot receiving the adjustment nut 118.

An anti-rattle spring 122 may be tensioned between a lug 124 on the stamping 116 and a lug 126 on the web 108. Clips 128 are welded to web 108 to guide the thrust member 116. The spring 122 may be arranged as shown in Figure 19 yieldingly to hold the adjustment nut 118.

While several illustrative embodiments have been described in detail, it is not my intention to limit the scope of the invention to those particular embodiments, or otherwise than by the terms of the appended claims.

I claim:

1. A brake having a rotatable drum, a backing plate at the open side of the drum carrying a fixed brake anchor, a brake band within the drum having reinforcements at its ends and having said anchor arranged between said ends, an adjustable thrust member having a threaded part adjustable to compensate for wear of the brake and which member is carried by one of said reinforcements and which engages said anchor, and a floating operating lever arranged in the space between the other reinforcement and the backing plate and which has an integral tongue bent back with respect to said lever and which is hooked over the end of said other reinforcement on one side of the anchor and which lever has a thrust part projecting past the other side of the anchor and engaging the adjustable thrust member and which lever also has a second integral tongue bent back with respect to the lever and embracing the inner edge of said other reinforcement.

2. A brake having a rotatable drum, a support at the open side of the drum carrying a fixed brake anchor, brake friction means within the drum having said anchor arranged between its ends, an adjustable thrust member having a threaded part adjustable to compensate for wear of the brake and which member is carried by one of said ends and which engages said anchor, and a floating operating lever arranged in the space between the other of said ends and the support and which has an integral tongue bent back with respect to said lever and which is hooked over the end of said other reinforcement on one side of the anchor and which lever has a thrust part projecting past the other side of the anchor and engaging the adjustable thrust member and which lever also has a second integral tongue bent back with respect to the lever and embracing the inner edge of said other reinforcement.

3. A brake having a rotatable drum, a backing plate at the open side of the drum carrying a fixed brake anchor, a brake band within the drum having reinforcements at its ends and having said anchor arranged between said ends, an adjustable thrust member having a threaded part adjustable to compensate for wear of the brake and which member is carried by one of said reinforcements and which engages said anchor, and a floating operating lever arranged in the space between the other reinforcement and the backing plate and which has an integral tongue bent back with respect to said lever and which is hooked over the end of said other reinforcement on one side of the anchor and which lever has a thrust part projecting past the other side of the anchor and engaging the adjustable thrust member.

4. A brake having an anchor, floating friction means arranged with said anchor between its ends, an adjustable thrust member mounted on one of said ends and engaging said anchor, and a floating operating lever having a thrust portion projecting past the anchor and engaging said adjustable member and having two tongues bent back with respect to the lever and embracing different parts of the other of said ends.

5. A brake having an anchor, floating friction means arranged with said anchor between its ends, an adjustable thrust member mounted on one of said ends and engaging said anchor, and a floating operating lever having a thrust portion projecting past the anchor and engaging said adjustable member and having a tongue bent back with respect to the lever and embracing the other of said ends.

6. A brake comprising an anchor, friction means having said anchor between its ends and one of which ends is provided with parallel projecting arms overlying and engaging said anchor, and a brake-applying lever engaging said ends and arranged immediately adjacent the anchor between said arms.

7. A brake comprising a cylindrical anchor, friction means having said anchor between its ends and one of which ends is provided with a projecting arm overlying and slidably engaging said anchor and which is also provided with an adjustable thrust member, and a brake-applying lever between and disconnectedly engaging the other end and the thrust member and arranged adjacent said overlying portion.

8. A brake comprising an anchor, friction means having said anchor between its ends, an adjustable thrust member mounted on one of said ends and engaging said anchor and having arms embracing said anchor between them to guide said end with respect to the anchor, and operating means arranged between and disconnectedly engaging the thrust member and the other of said ends.

9. A brake comprising friction means having a web at one end, and having a rim formed at the other end of the friction means with a pair of projecting arms embracing said web between them.

10. A brake comprising friction means having a web at one end which is formed with a slot, and a thrust member including a pair of stampings rigidly secured together beyond the end of the friction means and which stampings have semi-cylindrical portions embracing the web between them and overlying said slot, and an adjusting nut in said slot threaded on said semi-cylindrical portions.

11. A brake comprising friction means having a web at one end which is formed with a slot, and a thrust member including a stamping projecting beyond the end of the friction means to form an anchor-engaging part and which stamping has a cylindrical portion alongside the web and overlying said slot, and an adjusting nut in said slot threaded on said cylindrical portion.

12. A brake thrust member comprising two stampings secured together at one end of said member and having semi-cylindrical bodies spaced apart to straddle a web and externally threaded to receive an adjusting nut.

ROBERT F. KOHR.